UNITED STATES PATENT OFFICE.

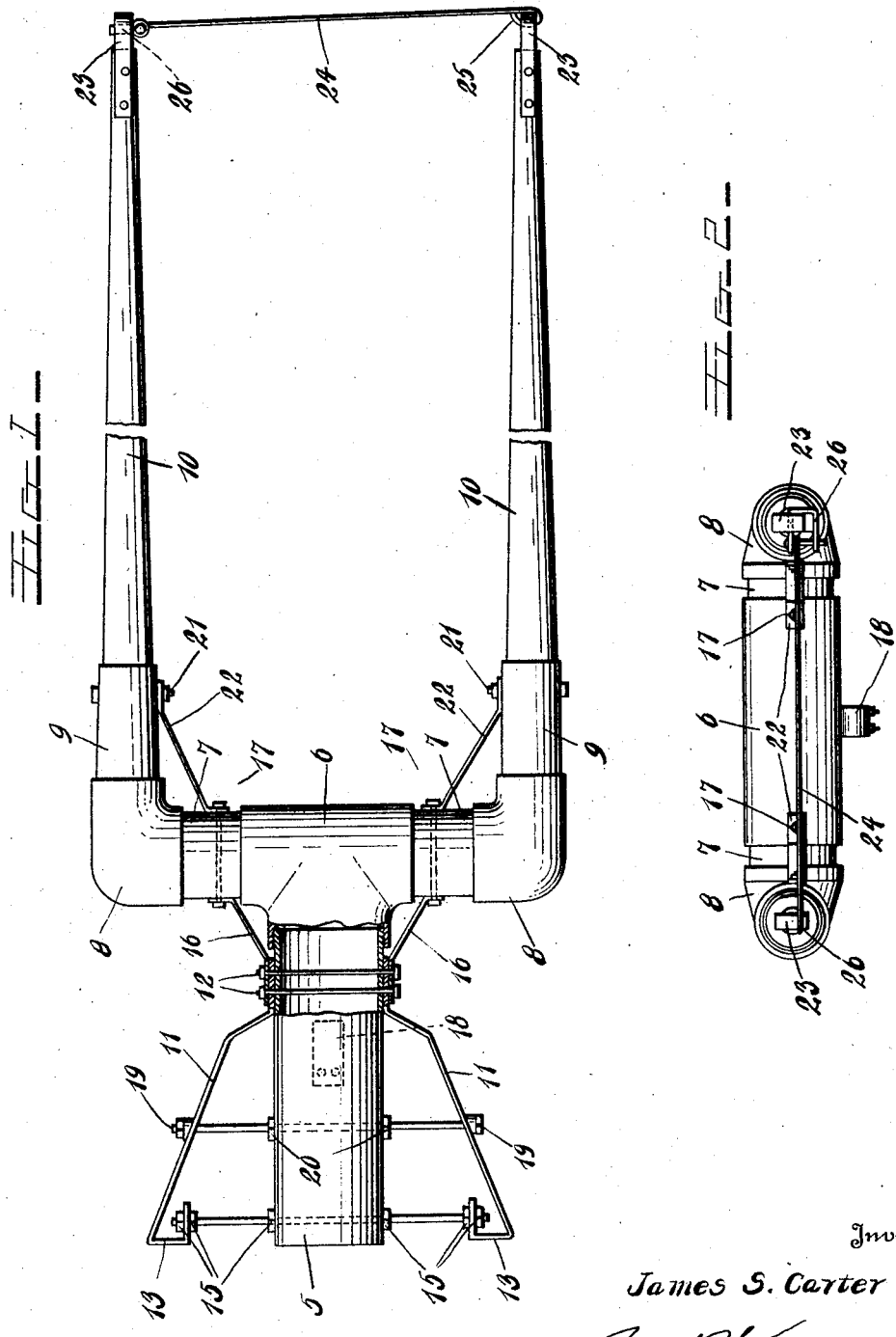

JAMES S. CARTER, OF ROBY, TEXAS.

DOUBLE TONGUE.

1,388,798. Specification of Letters Patent. Patented Aug. 23, 1921.

Application filed July 1, 1920. Serial No. 393,302.

*To all whom it may concern:*

Be it known that I, JAMES S. CARTER, a citizen of the United States, residing at Roby, in the county of Fisher and State of Texas, have invented certain new and useful Improvements in a Double Tongue, of which the following is a specification.

This invention relates to improvements in wagons and more particularly to a draft appliance especially designed for use in connection with one row planters, and has for its object to provide an improved double tongue structure possessing a high degree of strength and rigidity and enabling the effective use of three draft animals hitched to a wagon, agricultural implement or the like.

A further object is the provision of an improved double tongue structure capable of economical manufacture from standard types of metallic fittings so assembled as to permit quick and convenient application and removal thereof.

With these and other objects in view, the invention consists in certain novel features of construction as hereinafter shown and described and then specifically pointed out in the claim, and in the drawings illustrative of the preferred embodiment of the invention.

Figure 1 represents a top plan view of the double tongue, partially in section, and, Fig. 2 represents a front elevation thereof.

Referring to the drawing in detail, wherein similar reference numerals designate corresponding parts throughout the several views, the numeral 5 indicates the stub tongue which is preferably constructed of an appropriate length of metallic pipe of such size as to afford requisite strength and rigidity and which is connected at one terminal with a T-coupling 6 also of conventional design. The opposite terminals of the head of the T-coupling receive relatively short threaded pipe sections 7 carrying elbows 8 supporting pipe sections 9 constituting sockets for the draft tongues 10.

The front draft hounds 11 are preferably constructed of strap metal and the body or medial portions thereof are arranged in spaced relation to the stub tongue 5 and extend rearwardly therefrom in divergent relation. The front extremities of the hounds 11 are directed inwardly toward the stub tongue 5 and are extended forwardly in engagement therewith and upon opposite sides thereof, the extreme forward terminals of the hounds being connected with the stub tongue 5 by bolts or equivalent fastening devices 12. The rear extremities of the hounds 11 are directed inwardly and forwardly as at 13 and receive a relatively long connecting bolt 14 which passes through the rear portion of the stub tongue 5 and is provided at intervals with clamping nuts 15 whereby the bolt or brace rod is rigidly fastened in position upon the stub tongue and hounds.

The bolts 12 for the front terminals of the hounds are utilized to attach braces 16 to the stub tongue and extend forwardly therefrom into engagement with the head of the T-coupling 6 being adequately secured thereto by bolts 17. A coupling member 18 for a three horse evener (not shown) is attached underneath of the stub tongue 5.

A horizontally disposed bolt 19 is fast to the stub tongue 5 on the medial portions of the front hounds 11 and the connecting terminals thereof are adapted for connection with the rear hounds (not shown). A series of nuts 20 are threaded upon the rod or bolt 19 whereby the several parts engaged therewith are securely clamped.

The draft tongues 10 are securely held in position in the sockets 9 by bolts 21 which pass through the front portions of the sockets and the tongues 10 and also serve to secure the front terminals of forwardly diverging braces 22 the rear extremities of which are securely held beneath the heads of the bolts 17. The loops or straps 23 ordinarily provided at the front terminals of the draft tongues 10 serve as supporting and attaching means for a connecting rod 24 by which the front terminals of the tongues are connected and reinforce the latter. One terminal of the connecting rod is looped as at 25 and engaged with the strap 23 whereas the opposite terminal of the rod is also looped and detachably connected by a clevis 26 with the loop strap 23 of the opposite pole, a bolt or detachable pin being utilized to connect the clevis with the rod for convenience in removing the latter to permit access of a draft animal to the space between the tongues.

What I claim is:

The combination with a double tongue structure including a hollow stub tongue, a substantially T-shaped coupling carried by the front terminal thereof, angular draft pole sockets carried by the oppositely directed head of the T-coupling, braces connecting the head of the T-coupling with the sockets, hounds connected at their front terminals with the stub tongue and having angular rear terminals arranged in spaced relation to the stub tongue, braces connecting the head of the T-shaped coupling with the front terminals of the hounds, and a brace rod connecting the rear angular terminals of the hounds with the rear terminal of the stub tongue.

In testimony whereof, I affix my signature hereto.

JAMES S. CARTER.